United States Patent Office 3,623,921
Patented Nov. 30, 1971

3,623,921
COMPOSITION FOR PREVENTING BRAZE AND DIFFUSION FLOW
Cecil Behringer, Edina, Minn., and George J. Kamin, Towanda, Pa., assignors to Sylvania Electric Products Inc.
No Drawing. Filed Mar. 4, 1970, Ser. No. 16,583
Int. Cl. C23c 1/12
U.S. Cl. 148—22
12 Claims

ABSTRACT OF THE DISCLOSURE

A solid material containing a rare earth compound suspended in a fugitive carrier is useful in preventing braze and diffusion flow by applying the slurried compound to the material to be brazed or diffusion coated in a continuous layer by conventional methods. Alternative compositions are suspensions of rare earth compounds in a fugitive carrier and refractory metal oxides, admixed with rare earth compounds and mixtures thereof suspended in a fugitive carrier.

BACKGROUND OF THE INVENTION

This invention relates to a composition and method for preventing braze and diffusion coating flow. More specifically it relates to a suspension of a rare earth or mixed rare earth compound suspended alone in a fugitive carrier or admixed with refractory metal oxides suspended in a fugitive carrier and applied by conventional methods to the material to be brazed or diffusion coated.

In brazing applications it is usually necessary to apply a material to the joint and adjacent portion of the work piece to be brazed to prevent the filler alloy from flowing over the entire work piece. The most commonly used materials in this application are composed of highly refractory oxide such as alumina ($Al_2O_3$), titania ($TiO_2$) and magnesia (MgO). These materials have shown varying degrees of utility with the aluminum-silica, copper-gold, nickel-chromium, and copper-zinc filler alloys used in brazing. However, in brazing with the newer filler alloys such as palladium-nickel-gold and silver-copper-palladium, the existent stopoffs do not protect the surfaces and varying degrees of creep, break through, and undesired adhesion occur. Also, in the newer applications the inefficiency of the presently available stopoffs necessitate grinding of the joined surfaces to remove the undesired bonding agent and to produce a clear sharp junction. Overcoming these problems necessitate additional steps and expense.

Generally the same highly refractory oxides are used in diffusion coating applications. In this case, the refractory oxides are used to control the size of the area to be coated and have had only limited success in diffusion coating process such as carburizing, nitriding, and aluminizing. For example, in the diffusion coating of turbine parts such as nozzles, blades, and the like, the existent stopoffs do not protect the surfaces and the coatings are able to penetrate the stopoff. Also, many of the stopoffs themselves have a residual coating which must be removed by fine grinding to produce a marketable finished piece. Overcoming both problems necessitate additional steps and expense.

It is believed, therefore, that a brazing and diffusion coating stopoff which prevents brazing and diffusion coating flow that is easily and readily removed without having an appreciable amount of residue or necessitating costly additional steps is an advancement in the art.

SUMMARY OF THE INVENTION

In accordance with one aspect of this invention, there is provided a composition useful for stopping braze and diffusion coating flow. The composition consists essentially of a solid material and a fugitive carrier in weight ratios of from about 15:85 to about 60:40 wherein said solid material comprises from about 40 to about 100 weight percent of a rare earth compound selected from the group consisting of oxides, salts of lower aliphatic and salts of mineral acids and from about 0 to about 60 weight percent of a refractory metal oxide.

In accordance with another aspect of this invention, there is provided an improved process for brazing. The parts to be brazed are assembled with a filler alloy between the joint; and the joint and a portion of the parts adjacent to the joint are coated, before being brazed, with a substantially uninterrupted layer of a rare earth compound slurry composition as described above.

In accordance with still another aspect of this invention, there is provided an improved process for diffusion coating wherein a continuous substantially uninterrupted layer of the composition is applied to a portion of the parts that are not to be diffusion coated.

DESCRIPTION OF THE PREFERRED EMBODIMENTS

For a better understanding of the present invention together with other and further objects, advantages and capabilities thereof, reference is made to the following disclosure and appended claims in connection with the above description of some of the aspects of the invention.

The present invention relates to a rare earth compound slurry composition and a method for preventing braze and diffusion coating flow. Surprisingly, it has been found that when the aforementioned composition is prepared and applied to parts to be brazed and/or diffusion coated the flow of the filler alloy and/or coatings is controlled, and that the stopoff is easily and readily removed after the brazing and/or coating without any appreciable amount of residue.

Referring now to the invention with greater particularity, yttrium, for purposes of this invention, is to be considered one of the rare earth elements and included in the lanthanide series. The useful rare earth compounds are the rare earth oxides and heat decomposable rare earth compounds that decompose to form rare earth oxide. Useful heat decomposable compounds include the rare earth salts of lower aliphatic acids and mineral acids. As used herein lower aliphatic acids include those having from 1 to about 5 carbon atoms. Preferred compounds are the rare earth oxides, oxalates, carbonates and mixtures thereof. Preferred rare earths are yttrium and the heavy rare earths, that is, those having atomic numbers of 64 through 71, namely, gadolinium, terbium, dysprosium, holmium, erbium, thulium, ytterbium, lutetium and mixtures thereof. Of these yttrium oxide and yttrium carbonate are especially preferred. Yttrium and any of the heavy rare earths can be the sole component in the solid material that is suspended in the fugitive carrier, however, mixtures of these compounds can be used if desired. For example, yttrium oxide is one of the especially preferred rare earth compounds and beneficial results have been achieved when yttrium oxide is used in the solid material from about 60% to about 70% by weight along with from about 30% to about 40% of a heavy rare earth oxide.

As previously mentioned the solid material can include refractory metal oxides in conjunction with the rare earth compounds. The solid material can contain from about 40% to 100% by weight of the rare earth compound and from about 0% to about 60% by weight of a refractory metal oxide such as alumina ($Al_2O_3$), titania ($TiO_2$), magnesia (MgO) and the like. Solid materials comprising from about 40% to about 90% by weight of a rare earth compound and from about 10% to about 60% by weight of a refractory metal oxide are preferred for some applications. Especially preferred is a solid material comprising from about 80% to about 90% by weight of yttrium oxide, from about 5% to about 10% of titanium oxide and from about 5% to about 10% of aluminum oxide.

The solid material can be suspended in a fugitive carrier by any of the methods generally used for suspending pigments in paints. In practice, ball milling of the solids into the fugitive carrier and physical agitation to suspend the solids into the fugitive carrier are usually used. As used herein, a fugitive or volatile carrier is one that will either volatize or decompose to form volatile decomposition products when heated in air to a temperature of above about 150° C. Examples of fugitive carriers that can be employed are polyacrylamides, polyvinylacetates, polyvinyl pyrrolidone, homopolymers and copolymers of the lower alkyl acrylates and methacrylates (e.g. $C_1$ through $C_5$). Especially preferred are polyvinyl acetates such as lacquer L–18 as supplied by Raffi and Swanson, Inc.

The concentration of the rare earth compound in the carrier is varied as desired, depending on such factors such as the particular method of applying the coating, such as, for example, brushing, spraying, dipping and extruding the desired thickness of the individual coating, the number of coatings to be applied, the viscosity of the carrier, the desired covering power of the stopoff, the desired viscosity of the slurry, and other influencing factors. Typically, the solid material is present in the composition in an amount corresponding to about 175 to about 1500 grams per 100 gms. of the carrier.

The composition is applied to the desired areas of the parts to be brazed or diffusion coated by the methods well known to one skilled in the art—for example, brushing, spraying, extruding, etc. In brazing the aforementioned composition is generally applied to the joint and a portion of the parts next to the joint so as to prevent the filler alloy from running and covering the entire workpiece when the workpiece is brazed. Whereas in diffusion coating, the composition is generally applied to the areas of the workpiece not to be coated and which will be subjected to an atmosphere of the coating material.

After the workpiece is brazed or diffusion coated, the powder-like residue can be readily removed such as for example by wiping the residue off with a damp cloth, washing the workpiece with water, and air blasting the workpiece.

To more fully illustrate the present invention, the following detailed examples are presented. All parts, proportions, and percentages are by weight, unless otherwise given.

Example 1

About 500 parts of yttrium oxide is ball milled for about 24 hours using alumina balls. The oxide is dried for about 12 hours at about 130° C. and hammermilled. About 300 parts of the dried oxide is suspended in 200 parts of a 10 wt. percent solution of polyvinyl pyrrolidone in water by means of mechanical stirring for 24 hours. The resultant suspension (braze stopoff) is applied by brush to a joint and adjacent area of a metal to be brazed and which has a silver-copper-palladium filler alloy, so that the joint and adjacent area are coated. The metal is heated to above about 1742° C. After coating the braze stopoff is washed off the metal piece with water. The filler alloy is contained within the joint with no overflow.

Example 2

About 200 parts of yttrium oxide is added to about 250 parts of lacquer L–18, a low residue polyvinylacetate supplied by Raffi and Swanson, Inc. is ball milled for about 24 hours using alumina balls. The resultant suspension (diffusion coating stopoff) is applied by brush to parts of a turbine blade prior to aluminizing the blade. After coating the diffusion coating stopoff is wiped off with a damp cloth and the parts of the blade coated with the stopoff are not aluminized.

Example 3

About 45 parts yttrium oxide, about 2.5 parts alumina and about 2.5 parts titania are added to about 250 parts of lacquer L–18, a low residue polyvinylacetate supplied by Raffi and Swanson, Inc. is ball milled for about 24 hours using alumina balls. The resultant suspension (diffusion coating stopoff) is poured into the holes of a honeycomb piece of metal prior to diffusion coating it. After cooling the diffusion coating stopoff is wiped off with a cloth and the filled crevices are not coated.

Example 4

About 50 parts mixed rare earth oxides, containing about 70% yttrium, about 15% ytterbium, about 7% dysprosium, about 6% erbium, about 0.01% gadolinium, about 1.0% holmium, about 0.01% lanthanium, about 1.0% lutetium, about 0.1% terbium, and about 0.1% thulium, are added to about 250 parts lacquer L–18, a low residue polyvinylacetate supplied by Raffi and Swanson, Inc. is ball milled for about 12 hours using alumina balls. The resultant suspension (diffusion coating stopoff) is applied by brush to parts of a turbine blade prior to aluminizing the blade. After coating the diffusion coating stopoff is wiped off with a cloth and the parts of the blade coated with the stopoff are not aluminized.

Substantially the same results are obtained when the brazing and diffusion coating stopoffs are prepared using yttrium carbonate, yttrium oxalate, yttrium oxide admixed with gadolinium oxide, yttrium oxide admixed with terbium oxide and dysprosium oxide, and yttrium oxide admixed with alumina in substantially equivalent amounts to yield a composition having substantially the same solids content.

While there has been shown and described what are at present considered the preferred embodiments of the invention, it will be obvious to those skilled in the art that various changes and modifications may be made therein without departing from the scope of the invention as defined by the appended claims.

We claim:

1. A composition useful for stopping brazing and diffusion coating flow consisting essentially of a suspension of a solid material in a fugitive carrier in weight ratios of about 15:85 to about 60:40 respectively, said solid material comprising from about 40 to about 100 weight percent based on the total weight of said solid material of a rare earth compound selected from the group consisting of rare earth oxides, rare earth salts of lower aliphatic acids, rare earth salts of mineral acids and mixtures thereof and from about 0 to about 60 weight percent based upon the total weight of said solid material of a refractory metal oxide.

2. A composition according to claim 1 wherein said solid material is from about 40 to about 90 weight percent of said rare earth compound and from about 10 to 60 weight percent of a refractory metal oxide wherein said refractory metal is selected from the group consisting of aluminum, titanium, magnesium and mixtures thereof.

3. A composition according to claim 2 wherein in said solid material said rare earth compound is yttrium oxide and said refractory metal oxide is titanium oxide.

4. A composition according to claim 2 wherein in said solid material said rare earth compound is yttrium oxide and said refractory metal oxide is aluminum oxide.

5. A composition according to claim 2 wherein said solid material consists essentially of from about 80% to about 90% of yttrium oxide, from about 5% to about 10% of titanium oxide and from about 5% to about 10% of aluminum oxide.

6. A composition according to claim 5 wherein said fugitive carrier is selected from the group consisting of polyacrylamides, polyvinyl acetate, polyvinyl pyrrolidone, homopolymers and copolymers of the lower alkyl acrylates and methacrylates and mixtures thereof.

7. A composition according to claim 6 wherein said fugitive carrier is polyvinylacetate.

8. A composition according to claim 1 wherein said rare earth compound is selected from the group consisting of oxides, carbonates, oxalates, acetates and mixtures thereof.

9. A composition according to claim 1 wherein said rare earth is selected from the group consisting of yttrium, heavy rare earths and mixtures thereof.

10. A composition according to claim 9 wherein said solid material is yttrium oxide.

11. A composition according to claim 9 wherein said solid material is yttrium carbonate.

12. A composition according to claim 9 wherein said solid material is from about 60% to about 70% by weight of yttrium oxide and from about 30% to about 40% of heavy rare earth oxides.

References Cited

UNITED STATES PATENTS

| | | | |
|---|---|---|---|
| 1,785,173 | 12/1930 | Barrett | 148—23 |
| 2,367,978 | 1/1945 | Troy | 148—22 X |
| 2,473,887 | 6/1949 | Jennings et al. | 29—490 |
| 2,485,176 | 10/1949 | Waterfall | 148—22 X |
| 2,788,302 | 4/1957 | Dew | 148—22 X |
| 2,900,490 | 8/1959 | Petryck | 148—26 X |
| 3,202,554 | 8/1965 | Hornus | 148—22 |
| 3,454,433 | 7/1969 | Mueller | 148—22 |
| 3,493,713 | 2/1970 | Johnson | 148—22 X |

HYLAND BIZOT, Primary Examiner

G. T. OZAKI, Assistant Examiner

U.S. Cl. X.R.

148—23, 24; 106—62, 65; 117—5.5; 29—490